United States Patent
Liden et al.

(10) Patent No.: US 10,171,410 B2
(45) Date of Patent: Jan. 1, 2019

(54) CROSS-MODE COMMUNIATION

(71) Applicant: Microsoft Technology Licensing, LLC, Redmond, WA (US)

(72) Inventors: Lars Liden, Seattle, WA (US); Thomas Matthew Laird-McConnell, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 15/083,118

(22) Filed: Mar. 28, 2016

(65) Prior Publication Data

US 2017/0279759 A1    Sep. 28, 2017

(51) Int. Cl.
*G06F 15/16* (2006.01)
*G06F 15/173* (2006.01)
(Continued)

(52) U.S. Cl.
CPC .......... *H04L 51/36* (2013.01); *H04L 12/1822* (2013.01); *H04L 65/1069* (2013.01);
(Continued)

(58) Field of Classification Search
CPC ..... H04L 51/36; H04L 65/1069; H04L 67/10; H04L 67/24; H04L 67/303; H04L 67/306
(Continued)

(56) References Cited

U.S. PATENT DOCUMENTS 6,549,937 B1    4/2003 Auerbach et al.
6,782,403 B1    8/2004 Kino et al.
(Continued)

FOREIGN PATENT DOCUMENTS

EP    2141901 A1    1/2010
WO    9953676 A1    10/1999
(Continued)

OTHER PUBLICATIONS

Halder, Soumen, "Use Your Webcam With Multiple Programs Simultaneously", Published on: Jan. 25, 2011, Available at: https://www.maketecheasier.com/use-webcam-with-multiple-programs/, 3 pages.

(Continued)

*Primary Examiner* — Melvin H Pollack
(74) *Attorney, Agent, or Firm* — Schwegman Lundberg & Woessner, P.A.

(57) ABSTRACT

The techniques described herein are directed to cross-channel communication. The techniques can employ a central method, system, or mode ("Cross-Mode Manager" or "CMM" herein), which is enabled to send and/or receive messages over a multiplicity of modes. Users can enable the CMM through a variety of methods described herein on modes which the user uses to communicates. Once enabled on at least one channel which the user uses to communicate, the presence of the CMM across a multiplicity of modes allows a user to create and/or join a cross-channel communication session maintained by the CMM and to communicate between the user's communication mode and any of the multiplicity of modes for which the CMM has a presence. In other words, the techniques permit users to communicate across disparate channels from within a channel of their choosing.

18 Claims, 9 Drawing Sheets

(51) Int. Cl.
*H04L 12/58* (2006.01)
*H04L 29/06* (2006.01)
*H04L 29/08* (2006.01)
*H04L 12/18* (2006.01)
*G06F 15/177* (2006.01)

(52) U.S. Cl.
CPC .............. *H04L 67/10* (2013.01); *H04L 67/24* (2013.01); *H04L 67/303* (2013.01); *H04L 67/306* (2013.01); *H04L 51/04* (2013.01); *H04L 51/066* (2013.01)

(58) Field of Classification Search
USPC .......................................................... 709/202
See application file for complete search history.

(56) References Cited

U.S. PATENT DOCUMENTS

| | | | |
|---|---|---|---|
| 6,879,994 B1 | 4/2005 | Matsliach et al. | |
| 7,290,039 B1 | 10/2007 | Lisitsa et al. | |
| 7,315,613 B2 | 1/2008 | Kleindienst et al. | |
| 7,533,149 B2 | 5/2009 | Starbuck et al. | |
| 7,895,246 B2 | 2/2011 | Bauman et al. | |
| 7,903,637 B2* | 3/2011 | Moore .................... | H04L 29/06 370/352 |
| 7,921,214 B2* | 4/2011 | Da Palma ............... | H04L 51/02 709/206 |
| 8,121,653 B2* | 2/2012 | Marti .................... | H04M 1/2473 379/413.01 |
| 8,160,054 B2* | 4/2012 | Weiner .................... | H04L 51/04 370/260 |
| 8,171,080 B2 | 5/2012 | Gupta | |
| 8,199,763 B2* | 6/2012 | Sheridan ............. | H04L 65/1006 370/401 |
| 8,363,799 B2* | 1/2013 | Gruchala .......... | H04M 3/42059 379/142.06 |
| 8,407,298 B2* | 3/2013 | Kamat .................. | H04L 12/589 455/412.1 |
| 8,503,650 B2* | 8/2013 | Reding .................... | H04M 3/46 370/260 |
| 8,589,161 B2 | 11/2013 | Kennewick et al. | |
| 8,645,484 B2 | 2/2014 | Ferrell et al. | |
| 8,649,808 B2* | 2/2014 | Neely .................... | H04L 51/36 455/412.1 |
| 8,700,072 B2 | 4/2014 | Pascal et al. | |
| 8,706,912 B2* | 4/2014 | Baxter, Jr. .............. | H04L 51/36 379/88.14 |
| 8,793,617 B2* | 7/2014 | Xu .......................... | G06Q 10/10 715/825 |
| 8,861,537 B1* | 10/2014 | Braithwaite .......... | H04L 67/125 370/401 |
| 8,875,019 B2 | 10/2014 | Tan et al. | |
| 8,881,020 B2* | 11/2014 | Affronti .................. | G06F 3/038 715/744 |
| 8,917,828 B2 | 12/2014 | Bouzid et al. | |
| 9,043,474 B2 | 5/2015 | Schleifer et al. | |
| 9,137,228 B1 | 9/2015 | Newstadt | |
| 9,191,358 B2* | 11/2015 | Long .................. | H04L 67/2823 |
| 9,356,988 B2* | 5/2016 | Shuman .................. | H04L 65/80 |
| 9,392,053 B2* | 7/2016 | Fausak ................ | H04L 67/1002 |
| 9,413,882 B2* | 8/2016 | Gisby ...................... | H04K 1/00 |
| 9,451,425 B2* | 9/2016 | Pollack .................... | H04W 4/12 |
| 9,467,545 B1 | 10/2016 | Agranov | |
| 9,473,912 B2* | 10/2016 | Circosta .............. | H04W 88/182 |
| 9,532,197 B1* | 12/2016 | Lew ........................ | H04W 4/14 |
| 9,607,269 B2* | 3/2017 | Daly ........................ | G06N 7/005 |
| 9,794,762 B2* | 10/2017 | Bakos .................... | H04W 4/12 |
| 9,800,537 B2* | 10/2017 | Talwar .................... | H04L 51/36 |
| 9,843,543 B2* | 12/2017 | Ghafourifar ............ | H04L 51/36 |
| 2003/0093480 A1 | 5/2003 | Lagarde et al. | |
| 2005/0135595 A1 | 6/2005 | Bushey et al. | |
| 2005/0216550 A1 | 9/2005 | Paseman et al. | |
| 2007/0150603 A1 | 6/2007 | Crull et al. | |
| 2008/0147406 A1 | 6/2008 | Da Plama et al. | |
| 2009/0016504 A1* | 1/2009 | Mantell ................. | H04L 51/066 379/101.01 |
| 2009/0319918 A1 | 12/2009 | Affronti et al. | |
| 2009/0327441 A1 | 12/2009 | Lee et al. | |
| 2009/0328062 A1 | 12/2009 | Ganesan et al. | |
| 2010/0036923 A1 | 2/2010 | Byrne et al. | |
| 2010/0036926 A1 | 2/2010 | Ahart et al. | |
| 2010/0082750 A1 | 4/2010 | Kunz et al. | |
| 2010/0199340 A1 | 8/2010 | Jonas et al. | |
| 2011/0029923 A1 | 2/2011 | Xu et al. | |
| 2011/0060801 A1* | 3/2011 | Virk ........................ | H04L 51/24 709/206 |
| 2011/0196922 A1 | 8/2011 | Marcucci et al. | |
| 2012/0016678 A1 | 1/2012 | Gruber et al. | |
| 2013/0073636 A1 | 3/2013 | Zhu et al. | |
| 2013/0097333 A1* | 4/2013 | Bathurst ........... | H04L 29/06027 709/231 |
| 2013/0179521 A1* | 7/2013 | Hu .......................... | H04L 51/04 709/206 |
| 2013/0246050 A1 | 9/2013 | Yu et al. | |
| 2013/0304829 A1 | 11/2013 | Olsen et al. | |
| 2014/0040404 A1* | 2/2014 | Pujare ..................... | H04L 51/04 709/206 |
| 2014/0181137 A1 | 6/2014 | Stein | |
| 2014/0181864 A1 | 6/2014 | Marshall et al. | |
| 2014/0314225 A1 | 10/2014 | Riahi et al. | |
| 2015/0066479 A1 | 3/2015 | Pasupalak et al. | |
| 2015/0135214 A1* | 5/2015 | Reisman .......... | H04N 21/64322 725/37 |
| 2016/0050235 A1* | 2/2016 | Ghafourifar ........ | H04L 65/1033 709/203 |
| 2016/0119477 A1 | 4/2016 | Sharpe et al. | |
| 2016/0219149 A1 | 7/2016 | Krishnan et al. | |
| 2017/0279906 A1 | 9/2017 | Laird-mcconnell et al. | |
| 2017/0286069 A1 | 10/2017 | Karunakaran | |

FOREIGN PATENT DOCUMENTS

| | | |
|---|---|---|
| WO | 2013155619 A1 | 10/2013 |
| WO | 2015116708 A1 | 8/2015 |

OTHER PUBLICATIONS

"Message Systems Resources", Published on: Feb. 13, 2014, Available at: https://www.messagesystems.com/resources/glossary/cross-channel-communication, 2 pages.

"Momentum All-in-One Platform for Email, Mobile, Data & Analytics", Retrieved on: Feb. 15, 2016, Available at: https://www.messagesystems.com/products/momentum-platform, 6 pages.

"Nimbuzz:Free Calls & Messaging 3.2.0", Published on: Oct. 1, 2014, Available at: http://nimbuzz-free-calls-and-messaging.soft112.com/, 8 pages.

Williams, Alex, "Zapier Opens Its Developer Platform, Gives the Everyday Joe a Way to Connect APIs", Published on: Jan. 17, 2014, Available at: http://techcrunch.com/2014/01/17/zapier-opens-its-developer-platform-gives-the-everyday-joe-a-way-to-connect-apis/, 7 pages.

"Zup: Inter-Social Network Communication Tool", Published on: Jun. 14, 2008, Available at: http://www.orangeinks.com/tips-n-tricks/zup-inter-social-network-communication-tool/, 4 pages.

"International Search Report and Written Opinion Issued in PCT Application No. PCT/US2017/023500", dated May 30, 2017, 14 Pages.

"E-Messaging for e-Mail & SMS Communications", Retrieved From: http:/www.pbinsight.co.in/products/customer-communication-mgmt/document-comp/e-mail-sms-comms/e-messaging3/, Retrieved on: Oct. 6, 2015, 2 Pages.

"Luis Tutorial", Retrieved From: https://web.archive.org/web/20160319100811/https://www.luis.ai/Help, Feb. 20, 2016, 46 Pages.

"Final Office Action Issued in U.S. Appl. No. 15/083,019", dated Jul. 5, 2018, 29 Pages.

"Non-Final Office Action Issued in U.S. Appl. No. 15/083,019", dated Feb. 2, 2018, 25 Pages.

(56) References Cited

OTHER PUBLICATIONS

"Non-Final Office Action Issued in U.S. Appl. No. 15/083,984", dated May 31, 2018, 23 Pages.
Han, et al., "NLify: Lightweight spoken natural language interfaces via exhaustive paraphrasing", In Proceedings of UbiComp 2013, Jan. 1, 2013, 10 Pages.
"International Search Report and Written Opinion Issued in PCT Application No. PCT/US17/023922", dated Jun. 23, 2017, 10 Pages.
"International Search Report and Written opinion issued in PCT Application No. PCT/US2017/023496", dated Jun. 7, 2017, 13 Pages.
Sateli, et al., "Smarter mobile apps through integrated natural language processing services", In Proceedings of International Conference on Mobile Web and Information Systems, MobiWIS 2013, Aug. 26, 2013, 15 Pages.
Williams, et al., "Fast and easy language understanding for dialog systems with Microsoft Language Understanding Intelligent Service (LUIS)", In Proceedings of 2015 SIGDIAL Conference, Prague, Sep. 1, 2015, 3 Pages.

* cited by examiner

CROSS-MODE COMMUNIATION

BACKGROUND

As electronic communication services have proliferated, individuals that desire to communicate electronically are finding it increasingly difficult to identify suitable methods by which to communicate. Typically, any given person has accounts on a subset of the available communication services and tends to only actively use a smaller group of that subset. This presents a problem when individuals desire to communicate because individuals must first identify a common service to communicate over from the plurality of disparate services with which both persons may have accounts. Additionally, an identified service may be suitable for a time, but individuals may need to identify other services over which to communicate if they find that the current service has constraints or limitations that other services don't have. Moreover, individuals aren't always able to use methods of communication that they personally prefer. Individuals communicating using multiple electronic communication methods must also maintain a plurality of credentials and may not be thoroughly apprised of the capabilities of each communication service because individuals may not accumulate enough time with each service. The problem is only further aggravated when more than two individuals desire to communicate.

SUMMARY

This summary is provided to introduce simplified concepts relating to cross-mode communication. This summary is not intended to identify essential features of the claimed subject matter, nor is it intended for use in determining the scope of the claimed subject matter.

The techniques described herein are directed to cross-channel communication. The techniques can employ a central method, system, or mode ("Cross-Mode Manager" or "CMM" herein), which is enabled to send and/or receive messages over a multiplicity of modes. Users can enable the CMM through a variety of methods described herein on modes which the user uses to communicate. Once enabled on at least one channel which the user uses to communicate, the presence of the CMM across a multiplicity of modes allows a user to create and/or join a cross-channel communication session maintained by the CMM and to communicate between the user's communication mode and any of the multiplicity of modes for which the CMM has a presence. In other words, the techniques permit users to communicate across disparate channels from within a channel of their choosing.

Note that the term "mode" is used interchangeably with "channel" herein. As used herein, the term "channel" refers to any electronic communication mode or method.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
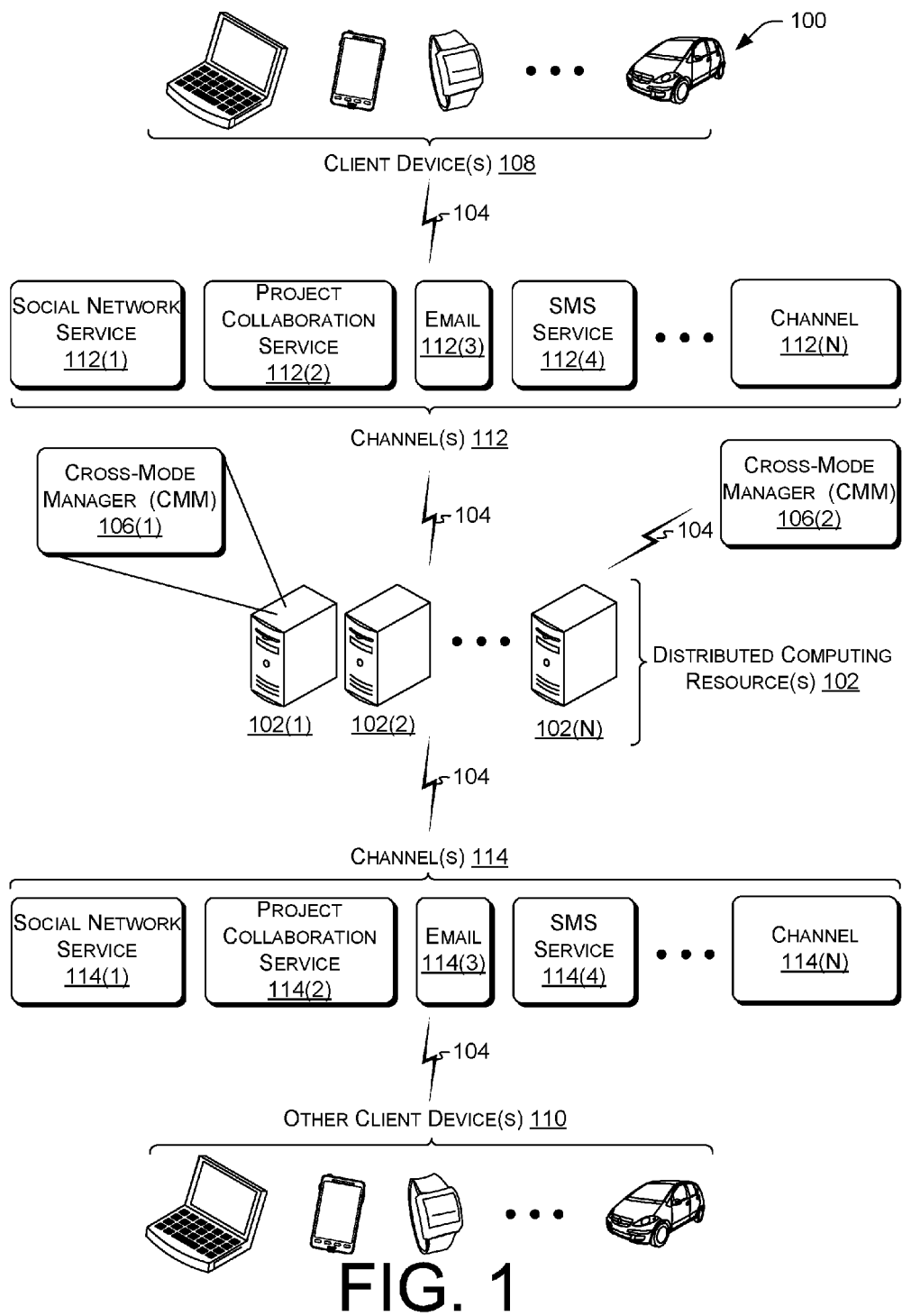
FIG. 1 is a block diagram depicting an example environment in which examples of cross-channel communication can operate.

This disclosure is directed to techniques to provide cross-mode communication.

Techniques allowing users to communicate across a variety of communication modes is described herein. The techniques permit a user to send and/or receive communication over a first mode while other user(s) with which the user is communicating are free to choose the mode by which the other user(s) communicate. For example, a first user can send message(s) via a first communication service and a second user can receive the message(s) via a second communication service. The techniques can employ a central method, system, or mode ("Cross-Mode Manager" or "CMM" herein) to facilitate cross-mode communication.

The CMM may be deployed so that users do not need to interact with a CMM interface in order to send and receive messages across modes. Users can use the interfaces associated with communication modes (e.g., a Skype® interface for a Skype® channel) to send and receive messages from other communication modes (e.g., messages can be displayed in a Skype® interface even though the messages were entered by another user in a Facebook® Messenger interface and messages can be entered into the Skype® interface and displayed in the Facebook® Messenger interface). In this way, users are able to communicate over a communication mode which they prefer.

Furthermore, the CMM can be agnostic to user credentials corresponding to the user's accounts for modes of communication. By employing a CMM that is agnostic to user credentials for modes of communication, the CMM provides a secure method of cross-channel communication since the CMM does not duplicate storage of user credentials for modes of communication outside the communication mode with which they may be stored. To accomplish this, the CMM can be configured to operate on a multiplicity of channels (e.g., by storing one or more of the following being associated with the CMM: client ids and tokens, usernames and passwords to CMM accounts on channels, API endpoints of channels, phone numbers associated with the CMM, email addresses associated with the CMM, other contact information, etc.). In other words, the CMM is configured to receive and/or send messages over a multiplicity of channels via a presence on those channels (e.g., having an account on the channel (i.e., an "agent account"), having negotiated with a channel service to send and receive messages over the channel, etc.). In this way, the CMM can receive via a first channel a message destined for another user over different channel via a CMM presence on a first channel, and the CMM can send that message to the other user over the different channel via a CMM presence on that different channel.

In order to be able to communicate across modes, a user can enable the CMM to be able to communicate with the user's accounts on the enabled modes. The CMM can also be given permission to communicate on the user's behalf (e.g., on the user's behalf using modes over which the user is not currently sending communication or modes with which the user does not have accounts).

The techniques effectively limit the memory space and processing that would be necessary to maintain a multiplicity of channels on one device. The techniques maximize a user's presence to all of the channels for which the CMM is enabled without the user having to increase the number of channels the user maintains beyond one, if the user so desires. A user can maintain a limited set of applications rather than needing to install and execute a multiplicity of applications corresponding to channels in order to maximize the user's presence on channels. Furthermore, the techniques can reduce required bandwidth by allowing the user to communicate via a limited set of channels and yet have access to the multiplicity of channels for which the CMM is enabled to operate.

The term "techniques" can refer to system(s), method(s), computer-readable media encoded with instructions, module(s), and/or algorithms, as well as hardware logic (e.g., field-programmable gate arrays (FPGAs), application-specific integrated circuits (ASICs), application-specific standard products (ASSPs), system-on-a-chip systems (SOCs), complex programmable logic devices (CPLDs)), etc. as permitted by the context described above and throughout the document.

Illustrative Environment

FIG. 1 is a block diagram depicting an example environment 100 in which examples described herein can operate. In some examples, the various devices and/or components of environment 100 include distributed computing resources 102 that can communicate with one another and with external devices via one or more networks 104. In at least one example, the distributed computing resources 102 can implement the techniques described herein. For example, the distributed computing resource(s) 102 can include a system for cross-mode communication. In order to implement cross-mode communication, the distributed computing resource(s) 102 can store thereon a cross-mode manager ("CMM," herein), such as CMM 106(1), or can communicate via network 104 with a remotely stored CMM 106(2). In some examples, some or all of the techniques described for the distributed computing resource(s) 102 can additionally or alternatively be implemented by one or more client device(s) 108. In some examples, a client device 108 can be programmed as the CMM. In some examples, the CMM can be part of a web service, accessible by an application programming interface (API).

In various examples, distributed computing resource(s) 102 include computing devices such as distributed computing resource(s) 102(1)-102(N). Examples support scenarios where distributed computing resource(s) 102 can include one or more computing devices that operate in a cluster and/or other grouped configuration to share resources, balance load, increase performance, provide fail-over support and/or redundancy, and/or for other purposes. Although illustrated as desktop computers, distributed computing resource(s) 102 can include a diverse variety of device types and are not limited to any particular type of device. For example, distributed computing resource(s) 102 can include any type of computing device having one or more processing unit(s) operably connected to computer-readable media, I/O interfaces(s), and network interface(s). The computer-readable media can have a CMM framework stored thereon or a framework to relay communication to and from a remotely stored CMM 106(2).

In some examples, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communication protocols, including packet-based and/or datagram-based protocols such as internet protocol (IP), transmission control protocol (TCP), user datagram protocol (UDP), and/or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

Example environment 100 also includes client device(s) 108 and other client device(s) 110. In some examples, the client device(s) 108 and/or other client device(s) 110 can include, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device such as one or more separate processor device(s), such as CPU-type processors (e.g., micro-processors), GPUs, or accelerator device(s). The client device(s) 108 and/or other client device(s) 110 can be any device by which a user may engage in a dialog with another entity.

In some examples, the client device(s) 108 and/or other client device(s) 110 are communicatively coupled to channel(s) 112 and 114, respectively, via network(s) 104, by which users can engage in dialog according to the techniques described herein. In some examples, although FIG. 1 depicts the channel(s) 112 and 114 as being in communication with the client device(s) 108 via network(s) 104. Communication can include dialog in some examples. As used herein, "dialog" can include an exchange of natural language. In additional or alternative examples, "dialog" can include an artificial language and/or computer code. In some examples, "dialog" can include an exchange of files.

Examples of channel(s) 112 and 114 can include social network channel(s) 112(1) and/or 114(1) (e.g., Facebook®, Google+®, Twitter®, etc.), project collaboration channel(s) 112(2) and/or 114(2) (e.g., GroupMe®, GitHub®, Basecamp®, etc.), email service(s) 112(3) and/or 114(3) (e.g., Outlook®, Gmail®, etc.), short message service (SMS) and/or voice service(s) 112(4) and/or 114(4), or any other channel 112(X) and/or 114(Y) (e.g., AOL Instant Messenger, Gtalk, Slack®, Skype®, Steam®, WhatsApp®, etc.) by which a client device 108 and/or 110 can engage in dialog with another entity.

In some examples, the channel(s) 112 to which the client device(s) 108 are linked correspond to channels with which a first user of the client device(s) 108 maintains a presence, has accounts, or has access to communicate. A first user may prefer a subset of these channel(s) 112 and may use particular ones for a majority of different kinds of communication (e.g., a first user may use one or more social network services 112(1) to communicate with friends; a project collaboration service 112(2) for file-sharing and communicating with co-workers; an SMS service 112(4) for friends, family, and coworkers; and may primarily use one email even though the user may have a plurality of email service accounts). Similarly, the channel(s) 114 to which the other client device(s) 110 are linked can correspond to channels with which a second user of the other client device(s) 110 maintains a presence, has accounts, or has access to communicate. It is contemplated that the client device(s) 108 and the other client device(s) 110 may be linked to a subset of channels that are the same and/or a subset of channels that are different depending on the channels to which the first user and second user have access. Note that it is contemplated that a user may maintain a presence on multiple channels over multiple devices and/or multiple users may maintain multiple channels on a single device. For simplicity, single users, and often single devices, are discussed herein, although multiple users and devices are contemplated.

According to the techniques described herein, the first user and the second user can use any channel of their liking to send and receive messages to and from the other user, respectively. For example, from the first user's perspective, the first user can use any one or more of the client device(s) 108 to send and receive messages over any one or more of the channel(s) 112 which are configured to work with the respective client device(s) 108. The messages sent over a channel by the first user can be delivered by the CMM to any one or more of the other client device(s) 110 over any one or more of the channel(s) 114, regardless of whether any of the one or more of the channel(s) 114 corresponds with any of the one or more channel(s) 112. The messages received at any one or more of the client device(s) 108 can be sent from the other client device(s) 110 over any one or more of the channel(s) 114, regardless of whether any of the one or more of the channel(s) 114 corresponds with any of the one or more channel(s) 112.

Example Scenario

Figure 2:
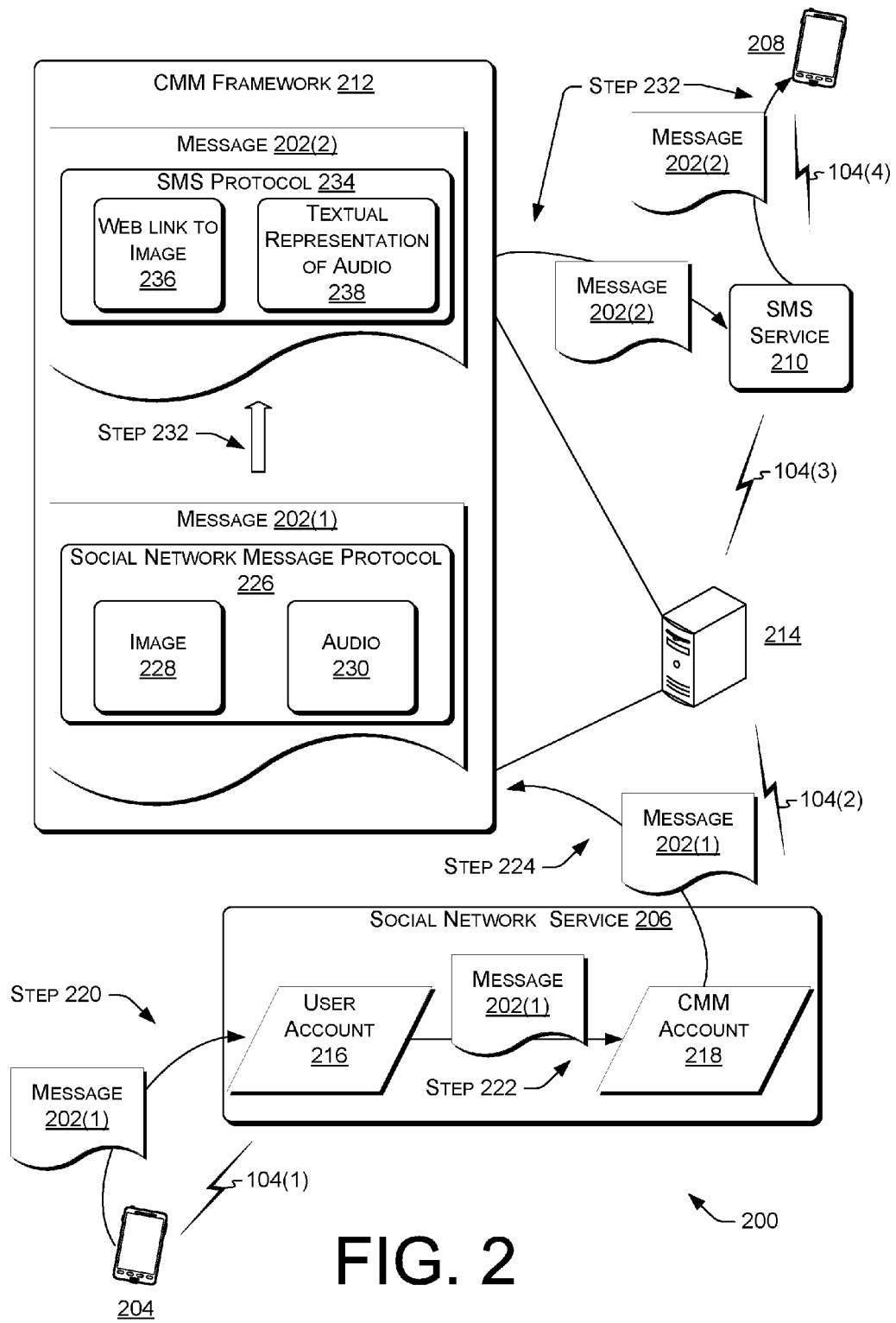
FIG. 2 is a block diagram depicting an example scenario of a single iteration of relaying a message via a cross-channel communication session from a first client device associated with a first channel to a second client device associated with a second channel.

FIG. 2 depicts an example scenario 200 implementing the techniques for a single iteration of relaying a message 202 from a first client device 204 associated with a first channel (e.g., social network service 206) to a second client device 208 associated with a second channel (e.g., short message service (SMS) service 210) via a cross-channel communication session established by a CMM framework 212. This example scenario 200 is an example limited to a particular configuration and should not be construed as limiting the techniques to this particular implementation; the example scenario 200 is given to further assist a person of ordinary skilled in the art in understanding the techniques described herein.

In some examples, the first client device 204 can be a client device 108 as depicted in FIG. 1, the second client device 208 can be another client device 110 as depicted in FIG. 1, the social network service 206 can be one of the channel(s) 112 (e.g. social network service 112(1)) as depicted in FIG. 1, the SMS service 210 can be one of the channel(s) 114 (e.g., SMS service 114(4)) as depicted in FIG. 1, and the CMM framework 212 can be stored on a computing resource 214 that can be one or more of the distributed computing resource(s) 102.

In this example, a cross-channel communication session has already been established between the first client device 204 and the second client device 208 via the CMM framework 212. This is described in more detail below, but in some examples, the cross-channel communication session can be established based on a message containing a command sent by the first client device 204 and via a user account 216 associated with the social network service 206 (i.e., the first channel) to a CMM account 218 (i.e., an "agent" account) associated with the social network service 206 (i.e., the first channel). The CMM account 218 can relay the message containing the command to the CMM framework 212 stored on the computing resource 214.

The CMM framework 212 can create a cross-channel communication session identifier and subsequently receive a message containing a request to join the cross-channel communication session and containing the cross-channel communication session identifier from the second client device 208 via a second channel (e.g., SMS service 210). To receive the message containing the request, the CMM can have an account with the SMS service, such as a phone number, to which the message containing the request can be addressed. The CMM SMS account can forward the message containing to the request to the CMM framework 212, which can subsequently establish a cross-channel communication session between the first client device 204 and the second client device 208.

Once a cross-channel communication session has been established by the CMM framework 212, the CMM framework 212 can relay messages from a first client device to other client device(s) associated with the cross-channel communication session (i.e., the second client device 208 in this example). In scenario 200, a user may generate a message 202(1) which the client device 204 sends (step 220) to a CMM account 218 associated with the social network service 206 via a user account 216 associated with the social network service 206, for example, via a network 104. In some examples, the user can generate the message 202(1) in a user interface displayed at the client device 204 associated with the social network service 206 which the user has access to via the user account 216 (e.g., a client application stored on a client device that permits a user to generate and send messages via the service associated with the client application when the user has an account with the service). For example, the user can use messaging functionality of a social network to send a message from the user account to a CMM account with the service (e.g., by posting on a CMM account "wall," by direct-messaging a CMM account, by @ mentioning a CMM account, etc.).

The social network service 206 relays the message 202(1) to the CMM account 218 associated with the social network 206 (step 222). It is of little to no consequence how the social network service 206 relays messages between accounts except that the CMM account be able to receive messages from a user by some mode. Upon receiving the message 202(1), the CMM account 218 can relay the message 202(1) to the CMM framework 212 stored on the computing resource 214, for example, via a network 104 (step 224). Note that FIG. 2 depicts network 104 communicatively coupling the first client device 204 and the social network service 206, the social network service 206 and the computing resource 214, and the computing resource 214 and the second client device 208. It is contemplated that the particular communication system between each can be different, but for simplicity network 104 is illustrated here.

The CMM framework 212 can include modules for converting received messages into messages suitable to be relayed by the CMM framework 212 over other channels. In this example, the CMM framework 212 can detect or can otherwise be apprised (e.g., by a channel identifier) of a protocol of the message 202(1). In this example, the message 202(1) may be structured to conform to a social network message protocol 226 and may contain an image 228 and audio 230 composing the content of the message 202(1). The CMM framework 212 can be further apprised of a fidelity and/or constraints of various channels (e.g., by channel data stored on the computing resource 214 or otherwise accessible to the CMM framework 212). For example, in preparing to relay the message 202(1) to the second client device 208 over the second channel (i.e., the SMS service 210), the CMM framework 212 can convert the message 202(1) (step 232), creating a converted message 202(2) that conforms to the protocols (i.e., SMS protocol 234), fidelity, and constraints of the SMS service 210 without sacrificing the content of the original message 202(1). For example, in converting the message 202(1) to create a converted message 202(2), the CMM framework 212 can be aware (e.g., by channel data accessible by the CMM framework 212) that SMS channels do not support images. In order to continue to provide the image 228 to a user associated with the second client device 208, in some examples, the CMM framework 212 can store a local copy of the image 228 accessible via a hyperlink which the CMM framework 212 can include as text in the converted message 202(2) content (i.e., web link to image 236).

Furthermore, the CMM framework 212 can, by audio-to-text modules of the CMM framework 212, convert the audio 230 to text and include the textual representation of the audio 238 in the content of the converted message 202(2). It is contemplated that the CMM framework 212 can create multiple converted messages if necessary (e.g., the destination channel only receives up to 140 character messages so that CMM framework 212 breaks text up into 140 character messages, multiple destination channels having different protocols, etc.). Once the converted message 202(2) is complete (e.g., the message conforms to the protocol of the destination channel, the message is of an appropriate fidelity, the message meets the constraints of the destination channel, etc.), the CMM framework 212 can relay the converted message 202(2) to the second client device 208 via the SMS service 210 (i.e., the second channel) (step 240). In order to relay the converted message 202(2) to the second client device 208 via the SMS service 210, the CMM can have an account with the SMS service 210 (e.g., a phone number) from which it can send the converted message 202(2).

Example Device

Figure 3:
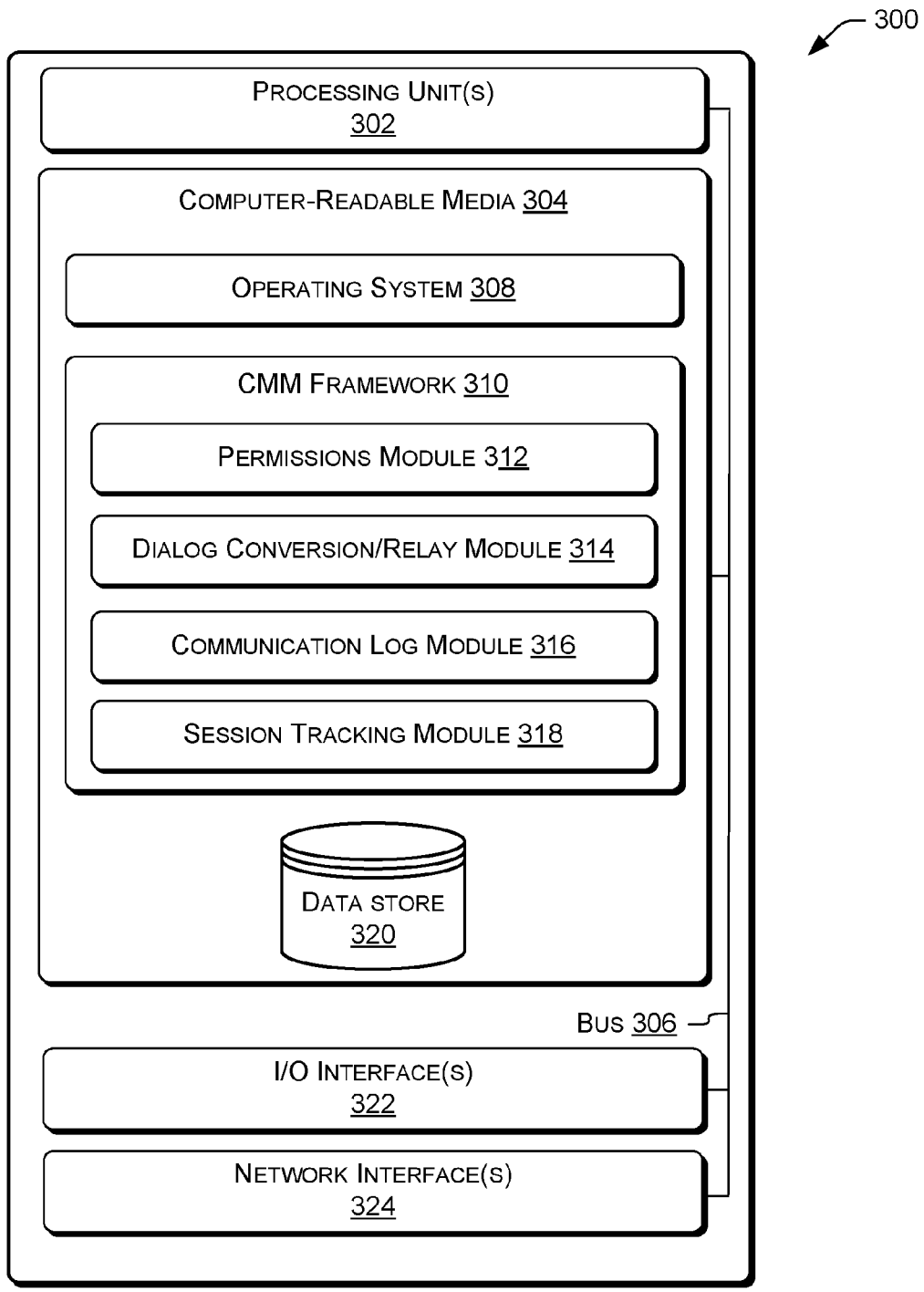
FIG. 3 is a block diagram depicting select components of an example device that can implement cross-channel communication, according to various examples.

FIG. 3 depicts select components of an example device 300, which can represent one or more of the distributed computing resources 102(1)-102(N), the client device(s) 108, other client device(s) 110, or other computing devices implementing some or all of the cross-mode communication techniques described herein. Example device 300 can include any type of computing device having one or more processing unit(s) 302 operably connected to computer-readable media 304. The connection may be via a bus 306, which in some instances may include one or more of a system bus, a data bus, an address bus, a PCI bus, a Mini-PCI bus, and any variety of local, peripheral, and/or independent buses, or via another operable connection. Processing unit(s) 302 can represent, for example, microprocessors, controllers or any other suitable type of processors for processing computer executable instructions to control the operation of the device in order to facilitate cross-channel communication. In some examples, where a system on a chip architecture is used, the processing unit(s) 302 can include one or more fixed function blocks (also referred to as accelerators) which implement a part of the method by employing a CMM 106 in hardware (rather than software or firmware).

The computer-readable media 304 includes two types of computer-readable media, namely computer storage media and communication media. Computer storage media can include volatile and non-volatile, non-transitory machine-readable, removable, and non-removable media implemented in any method or technology for storage of information (in compressed or uncompressed form), such as computer (or other electronic device) readable and/or executable instructions, data structures, program modules, and/or other data to perform processes or methods described herein. Computer storage media includes, but is not limited to hard drives, floppy diskettes, optical disks, CD-ROMs, DVDs, read-only memories (ROMs), random access memories (RAMs), EPROMs, EEPROMs, flash memory, magnetic and/or optical cards, solid-state memory devices, and/or other types of physical machine-readable media suitable for storing electronic instructions.

In contrast, communication media embodies computer-readable instructions, data structures, program modules, and/or other data in a modulated data signal, such as a carrier wave, and/or other transmission mechanism. As defined herein, computer storage media does not include communication media.

Example device 300 can include, but is not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, and/or any other sort of computing device such as one or more separate processor device(s), such as CPU-type processors (e.g., micro-processors), GPUs, and/or accelerator device(s).

In some examples, as shown regarding device 300, computer-readable media 304 can store instructions executable by the processing unit(s) 302, which can represent a CPU incorporated in device 300. Computer-readable media 304 can also store instructions executable by an external CPU-type processor, executable by a GPU, and/or executable by an accelerator, such as a field programmable gate array (FPGA)-type accelerator, a digital signal processing (DSP)-type accelerator, and/or any internal or external accelerator.

Executable instructions stored on computer-readable media 304 can include, for example, an operating system 308, a CMM framework 310, and other modules, programs, and/or applications that can be loadable and executable by processing units(s) 302. The CMM 106 can include the device 300 having the CMM framework 310 stored thereon.

CMM 106 and CMM framework 310 are used interchangeably herein since the CMM framework 310 often accomplishes the functionality of the CMM 106. The CMM framework 310 can be the CMM framework 212 described in regard to FIG. 2. The CMM framework 310 can include permissions module 312, dialog conversion/relay module 314, communication log module 316, and/or session tracking module 318. The techniques can be deployed in more or less modules. As mentioned above, the functionally described herein can be performed, at least in part, by one or more hardware logic components such as accelerators. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), etc. For example, an accelerator can represent a hybrid device, such as one from XILINX or ALTERA that includes a CPU core embedded in an FPGA fabric.

In the illustrated example, computer-readable media 304 also includes a data store 320. In some examples, data store 320 includes data storage such as a database, data warehouse, and/or other type of structured or unstructured data storage. In some examples, data store 320 includes a relational database with one or more tables, indices, stored procedures, and so forth to enable data access. Data store 320 can store data for the operations of processes, applications, components, and/or modules stored in computer-readable media 304 and/or executed by processor(s) 302, and/or accelerator(s), such as modules 312-318. Alternately, some or all of the above-referenced data can be stored on separate memories such as memories of the distributed computing resource(s) 102, client device(s) 108, other client device(s) 110 a memory on board a CPU-type processor (e.g., microprocessor(s)), memory on board a GPU, memory on board an FPGA type accelerator, memory on board a DSP type accelerator, and/or memory on board another accelerator).

Device 300 can further include one or more input/output (I/O) interface(s) 322 to allow device 300 to communicate with input/output devices such as user input devices including peripheral input devices (e.g., a keyboard, a mouse, a pen, a game controller, a microphone or audio input device, a touch input device (e.g., touch screen, touch pad, etc.), a gestural input device, camera(s), and the like) and/or output devices including peripheral output devices (e.g., a display, a printer, audio speakers, a haptic output, bone conduction for audio sensation, and the like). In some examples, the I/O interface(s) 322 can be used to communicate with client device(s) 108 or other client device(s) 110. Device 300 can also include one or more network interface(s) 324 to enable communication between computing device 300 and other networked devices such as client device(s) 108 and/or other client device(s) 110. Such network interface(s) 324 can include one or more network interface controllers (NICs) and/or other types of transceiver devices to send and/or receive communications over a network, such as network(s) 104.

Example device 300 includes an example CMM framework 310 that can be distributively or singularly stored on device 300, which, as discussed above, can include one or more devices such as distributed computing resources 102 (1)-102(N), client device(s) 108, or other client device(s) 110. Some or all of the modules can be available to, accessible from, or stored on a remote device and/or distributed computing resources 102, which can be configured as a cloud services system. In some examples, an CMM framework 310 includes modules 312-318 as described herein that provide cross-mode communication. In some examples, any number of modules could be employed and techniques described herein as employed by one or more modules can be employed by a greater or lesser number of modules.

The permissions module 312 can include computer-executable instructions that, when executed, program processing unit(s) 302 to receive credentials associated with a channel and the CMM (i.e., CMM-side authentication on a channel), the credentials authorizing the CMM framework 310 to operate on that channel (e.g., allowing the CMM to maintain a presence on that channel, equivalently, to send and receive messages over that channel). The permissions module can also be programmed to seek user permission for a CMM framework 310 to contact a client device over a channel and/or or to relay messages on behalf of and to the client device over other channels (i.e., user-side channel permissions). The purpose of authenticating the CMM framework 310 on a channel is to allow the CMM framework 310 to communicate over that channel.

In some examples, authentication of the CMM framework 310 on various channels can include providing prompts to register the CMM framework 310 with the channel by the permissions module 312 (e.g., setting up a username, password, and other information to create an account with the channel; creating an email account; negotiating with an entity for access to a channel (e.g., providing prompts to complete an application for a radio call sign, completing a cell provider's requirements to receive a phone number); registering with an API to receive a client id and token, etc.). The permissions module 312 can redirect a user authenticating the CMM framework 310 to operate over a channel to a channel web page, cause display of a registration form and relay inputs to the form to the channel via a channel API, or otherwise facilitate authentication of the CMM framework 310 so that the CMM framework 310 can operate over the channel. In some examples, after an authentication flow or other registration process, the permissions module 312 can store information (e.g., in the data store 320) (e.g., client ids and tokens, usernames and passwords, API endpoints of channels, phone numbers, email addresses, other contact information, etc.) sufficient to allow the CMM framework 310 to operate over channels. In some examples, the dialog conversion/relay module 314 can make calls to a channel API via an API endpoint reference, for example stored in the data store 320, to send and receive and/or access messages, files, and/or other communication on behalf of the CMM and/or a client device. In some examples, authentication of the CMM framework 310 for a channel occurs per channel, not per user. In other words, once the CMM framework 310 is authenticated on a channel, users can contact the CMM framework 310 via that channel to initiate a cross-channel communication session.

Regarding user-side channel permissions, the permissions module 312 can be programmed to cause display of a list of channels over which a user can grant permission to the CMM framework 310 to operate. For example, by granting the CMM framework 310 permission to operate on a channel, a user is able to send messages to other channels over the channel on which the user granted the CMM framework 310 permission to operate. The user can also receive messages from other channels over the channel on which the user granted the CMM framework 310 permission to operate. In some examples, the permissions module 312 can redirect a user to a web page associated with a channel to allow the user to direct the channel to allow the CMM framework 310 to access communication and/or to act on behalf of the user (e.g., to make requests of the web service, receive messages from the channel service sent by the user, deliver messages sent from other channels, etc.), thereby allowing the CMM framework 310 to remain agnostic of user credentials (e.g., the user may authenticate themselves with the channel service and, once authenticated with the channel, direct the channel service to grant permission to the CMM framework 310). In some examples, a user can grant the CMM framework 310 permission by adding an account associated with the CMM framework 310 to a user's contact list or by adding an account associated with the CMM framework 310 to a group discussion.

In some examples, a user can enable the CMM framework 310 on a channel with which the user is associated (e.g., the user has an account, is registered, or otherwise has access to the channel) without granting the CMM framework 310 permissions. In some examples, contacting the CMM framework 310 over a channel may be sufficient to accomplish the techniques. In some examples, the CMM framework 310 can use an identification associated with the user (e.g., an email address, a phone number, a user id, a username, a MAC address, etc.) and the channel in order to accomplish the techniques.

For example, a first client device can send an SMS to a phone number associated with the CMM framework 310 to initiate a cross-channel communication session (or otherwise enabling the CMM framework 310 such as by granting it permission as discussed above). The CMM framework 310 can store the phone number from which it received the SMS message, with which it can accomplish the techniques discussed herein. In some examples, the CMM framework 310 can associate the phone number with a cross-channel communication session. The CMM framework 310 can also receive an email from a second client device requesting to join the cross-channel communication session (or otherwise enabling the CMM framework 310 such as by granting the CMM framework 310 permission as discussed above). In some examples, the CMM framework 310 can associate email information associated with the email received (e.g., an email address) with the cross-channel communication session.

Subsequently, the CMM framework 310 may receive an SMS message from the first client device, which the CMM framework can convert to an email (e.g., by copying the body of the SMS message and pasting it into an email). The CMM framework 310 may then send the generated email via an email account associated with the CMM framework 310 to the second client device. The CMM framework 310 can similarly receive, convert, and relay emails from the second device as SMS messages to the first device. Note that in some examples it is possible to contact the CMM framework 310 over a particular channel because the CMM framework 310 has been registered with that channel as discussed above. Also, note that it is contemplated that, although the example above discusses two client devices for simplicity, the techniques can be implemented with one device. In that example, the CMM framework 310 relays messages received from the client device via one channel to the client device via a different channel. It is also contemplated that the CMM framework 310 can relay messages from any first client device to multiple other devices over multiple different channels.

The dialog conversion/relay module 314 can include computer-executable instructions that, when executed, program processing unit(s) 302 to create dialog sessions, convert received messages to a format suitable for a destination channel, and relay received messages to a client device associated with the destination channel.

In some examples, the dialog conversion/relay module 314 can receive a command to create a cross-channel communication session (equivalently, a dialog session herein). In some examples, the command can include parameters such as a dialog session name and/or a communication destination identifier (e.g., a username, electronic address, etc. of an entity a user is trying to communicate with). For example, a user can input a command (e.g., "new_conv," etc.) into an interface for a channel associated with the user (e.g., the user can type "new_conv" into a graphical user interface for an SMS channel) with a dialog name following (e.g., "new_conv USS Enterprise") and send the command and any parameters to an account associated with the CMM framework 310 and the channel (e.g., for an SMS containing the command, a phone number associated with the CMM; for an email containing the command, an email account associated with the CMM; for a social media service message, a user account on the social media service or a group discussion to which an account associated with the CMM has been added, etc.).

In some examples where the CMM framework 310 is privy to (e.g., is able to access) communication from the user without the user directly contacting the CMM framework (e.g., when an account associated with the CMM is added to a group conversation including the user, when the CMM has been granted permission to access messages sent by the user as discussed above, etc.), the dialog conversion/relay module 314 can detect the command and any parameters from communication from the user. For example, if the CMM has been registered with a group chat service and a user adds an account associated with the CMM and the group chat service to a group chat over the group chat service, the user can send a message to the group chat containing the command and any parameters. The CMM framework 310 can detect the presence of the command from the sent message. For example, the CMM framework 310 can include or be configured to be communicatively coupled to natural language processing APIs that can use machine learning, disambiguation, and/or phrase detection to detect the command from the group chat.

In some examples, in response to receiving the command and any parameters, the dialog conversion/relay module 314 can create a dialog session by associating together a channel identifier, a user identification associated with a user and the channel from which the command was received (e.g., a phone number, an email, a username, etc.), and a destination identifier and/or dialog session name. In some examples, the destination identifier is an identifier that allows the CMM framework 310 to relay messages to a second client device associated with another channel. Information composing the destination identifier can include one or more of a target channel identifier (e.g., @email.com, a name of the target channel) or a user identifier (e.g., a phone number, user name, etc.).

In an example where a received command includes a parameter specifying a destination identifier, the dialog conversion/relay module 314 can associate together a channel identifier for the channel from which the command was received (e.g., email), a first user identification associated with a first client device and with the channel from which the command was received (e.g., user@email.com), the destination identification (e.g., a second user identification, a phone number), and a destination channel identifier corresponding to the destination identifier (e.g., SMS). In some examples, the dialog conversion/relay module 314 can store this information in a single row of a table, where rows of the table represent different dialog sessions. For example, the dialog conversion/relay module 314 can receive an email from a first client device containing the text, "new_conv+ 11234567890." In response, the dialog conversion/relay module 314 can create a row in a table similar to the example Table 1 illustrated below:

TABLE 1

| First Channel Identifier | First User Identification | Destination Channel Identifier | Destination Identification | CMM-Generated Session Identifier |
|---|---|---|---|---|
| Email | user@email.com | SMS | +1 123 456 7890 | 17334 |

In some examples, the dialog conversion/relay module 314 can add a CMM-generated session identifier to identify the dialog session and more easily retrieve the dialog session data in order to relay messages more quickly. The dialog conversion/relay module 314 can use this table to relay messages received from the first device over the email channel (via user@email.com) (e.g., received over the email channel at CMM@email.com) to a second device over the SMS channel (e.g., via a phone number associated with the CMM and by sending the message to +1 123 456 7890). In some examples, the table can be used to relay messages in the reverse (i.e., receiving messages from the second device over the SMS channel and sending them to the first device over the email channel).

In some examples, more columns can be added as more commands are received specifying additional destination identifications. In order to facilitate joining additional parties, the dialog conversion/relay module 314 can provide the CMM-generated session identifier to a user so that the user can include the CMM-generated session identifier in a command also including the additional destination identification to be added. In some examples, a user specifies the channel identifier associated with the destination identification. In other examples, the dialog conversion/relay module 314 can detect the destination channel identifier most suitable (e.g., a string of eleven, ten, or seven numbers can be associated with an SMS identifier; "@username" can be associated with a social media identifier; "@_____.com" can be associated with an email identifier; etc.).

In another example, a received command can include a parameter specifying a dialog session identifier (e.g., a conversation name). In this example, the dialog conversion/relay module 314 can associate together a channel identifier for the channel from which the command was received (e.g., email), a first user identification associated with a first client device and with the channel from which the command was received (e.g., user@email.com), the destination identification (e.g., a second user identification, a phone number), and a destination channel identifier corresponding to the destination identifier (e.g., SMS). For example, the dialog conversion/relay module 314 can receive an email from a first client device containing the text, "new_conv USS Enterprise." In response, the dialog conversion/relay module 314 can create a first row (excluding the bolded headers) in a table similar to the example Table 2 illustrated below. The dialog session identifier can then be shared by any method (e.g., word of mouth, advertisement, etc.) and a second user can send a request by a second device to join the dialog session, the request comprising a command (e.g., "join_conv") and the dialog session identifier (e.g., "USS Enterprise"). For example, the dialog conversion/relay module 314 can receive from a second device over an SMS channel an SMS containing the text, "join_conv USS Enterprise." In response, the dialog conversion/relay module 314 can create the second row (excluding the bolded headers) of the example Table 2 illustrated below.

TABLE 2

| Channel Identifier | User Identification | Dialog Session Identifier |
|---|---|---|
| Email | user@email.com | USS Enterprise |
| SMS | +1 123 456 7890 | USS Enterprise |

The dialog conversion/relay module 314 can use this table to relay messages received from the first device over the email channel (via user@email.com) (e.g., received over the email channel at CMM@email.com) to a second device over the SMS channel (e.g., via a phone number associated with the CMM and by sending the message to +1 123 456 7890). In some examples, the table can be used to relay messages in the reverse (i.e., receiving messages from the second device over the SMS channel and sending them to the first device over the email channel).

Note that, as the terminology is used herein, depending on the direction of the flow of messages, a destination channel refers to a channel for which messages are intended. The destination channel changes depending on the client device from which the messages are received. For example, in the example above "user@email.com" can send an email to the CMM. The destination channels can be associated with any client devices that have joined the dialog session and have associated channel identifiers and user identifications (e.g., the SMS channel above with the user identification +1 123 456 7890). For example, the destination channel will become the email channel when a client device associated with the SMS replies.

Also note that the CMM framework 310 provides, by the dialog conversion/relay module 314 functions described above, a method of dialog spanning two or more channels.

In some examples, the dialog conversion/relay module 314 can be programmed to receive passwords for the dialog session. For example, an additional parameter of the commands and/or requests can include a password parameter (e.g., "new_conv <USS Enterprise><borgscum>," "join_conv <USS Enterprise> <borgscum>"). Alternately, upon receiving a command or a request, the dialog conversion/relay module 314 can prompt the user to create or enter a password, respectively. In some examples, the dialog conversion/relay module 314 can be programmed to receive an elevation command. Responsive to an elevation command, the dialog conversion/relay module 314 can associate administrator privileges with a user identification. In some examples, the dialog conversion/relay module 314 can additionally or alternatively notify a user that created the dialog session (or another user identified as an administrator) that a user has requested to join the dialog session and ask for the creator's (or administrator's) approval to associate the dialog session identifier with the user that is requesting to join.

In some examples, the dialog conversion/relay module 314 can be configured to receive termination commands. In these examples, a received command to terminate can cause the dialog conversion/relay module 314 to disassociate the dialog session identifier from one or more users in a dialog session. In some examples, the dialog conversion/relay module 314 can also receive and respond to a variety of queries such as, for example, queries regarding what user identifications are associated with a dialog session identifier, queries regarding which dialog session identifier is associated with a current dialog, and queries for help menus.

In some examples, the dialog conversion/relay module 314 can convert messages received from one channel to comport with characteristics of a destination channel. Characteristics of a channel can include, for example, a format of communication (e.g., body of messages include one or more of text, audio, video, etc.; constraints of the channel (e.g., the channel only accepts up to 140 character or 160 character messages); etc.), channel protocols (e.g., syntax and semantics requirements; parameters; protocol layering; requirements to appropriately interact with application, transport, internet, and/or network interface layers, etc.), and so on. The dialog conversion/relay module 314 can include one or more of a compiler, assembler, link editor, or loader to convert received messages. In some examples, the dialog conversion/relay module 314 can upgrade or downgrade the fidelity (e.g., content richness) of received messages. Low fidelity channels include channels with more sparse content, such as, for example, SMS, messaging, email, web pages, surveys, questionnaires, other forms, etc. High fidelity channels are more content rich, such as, for example, voice, video-conferencing, hologram, etc. To upgrade or downgrade fidelity of received messages, the dialog conversion/relay module 314 includes various conversion modules such as video-to-speech, speech-to-text, picture-to-web link, etc. modules to conform messages to the characteristics of a channel.

For example, a user can create a message including a picture with associated audio describing the picture to send (via a first channel of medium to high fidelity) to a text-based channel that only accepts 140-character text messages (i.e., a low fidelity channel). The user sends the message to the CMM and, in order to relay the message, the dialog conversion/relay module 314 can convert the audio to text, which the dialog conversion/relay module 314 can relay to a client device associated with the text-based channel in 140-character "chunks." To relay the picture, the dialog conversion/relay module 314 can store the picture temporarily and send, to the client device associated with the text-based channel, a message including a web link to be able to access the picture.

In some examples, the dialog conversion/relay module 314 can relay received messages to a client device associated with a destination channel based at least in part on dialog session information. The dialog conversion/relay module 314 can receive a message via a channel over which the CMM framework 310 is authorized to operate (e.g., the CMM has been registered with the channel, the CMM has an account associated with the channel to which the client device sent a message, a client device sent a message to the CMM over the channel, or the CMM is otherwise configured to operate over the channel as discussed above) and the dialog conversion/relay module 314 can convert the received message as necessary for destination channel(s). In some examples, the dialog conversion/relay module 314 can look up entries in a table, such as example Tables 1 and 2 above, to determine whether conversion is needed and to determine what conversions may be necessary to conform the received messages with the characteristics of the destination channel(s). After checking to see if conversion is necessary and conducting any necessary conversion, the dialog conversion/relay module 314 can send the (converted) received messages to client device(s) associated with the destination channel(s). To send the converted received messages, the dialog conversion/relay module 314 can send the messages from accounts associated with the CMM and the respective channel(s) (or however the CMM may be configured to operate over the respective channel(s), as discussed above) to client device(s) associated with the destination channel(s) (e.g., via user identification(s) associated with the destination channel(s)). The CMM can similarly relay messages received from client device(s) associated with the destination channel(s) to the first device and any other device(s) associated with the destination channel(s).

Furthermore, the CMM framework 310 can ensure that the conversational context of the conversation is preserved through changes of the channel which a user is using. For example, the communication log module 316 can include computer-executable instructions that, when executed, program processing unit(s) 302 to capture and store communication between client device(s) and/or between client device(s) and the CMM framework 310.

In some examples, the communication log module 316 can capture at least part of communication between client device(s) and/or between client device(s) and the CMM framework 310. In some examples, the communication log module 316 can store the communication in a communication log. In some examples, the communication log module 316 may retain communications in the communication log for a duration of time (e.g., for the duration of a dialog, for a user pre-defined duration, until a user dissociates from an agent, until a user profile associated with the communication log is deleted or deactivated, for a week, for a year, for five years). In some examples, the communication log module 316 can encrypt the communication log. In some examples, the communication log can be secured by security policies of the device 300. In some examples, the communication log module 316 can provide an option to a user to begin, stop, or never log communication. The communication module 316 can also allow a user to select format(s), channel(s), and client device(s) from which communication logs can be captured and/or stored.

In some examples, the communication log can be accessed by the dialog conversion/relay module 314 or the session tracking module 318 to provide seamless dialog (e.g., the ability for a user to dialog with another user across devices, languages, channels, etc. without accessing another service or re-initiating a dialog session). For example, the dialog conversion/relay module 314 can include a message-intelligent service that uses natural language processing, disambiguation, and/or other processing methods to detect service triggers, cultural context of a user, and/or other biographical data about a user from a communication log and/or ongoing dialog. The dialog conversion/relay module 314 can use these services to identify when commands and/or requests relevant to cross-channel communications have been given by a client device (e.g., detecting a command to initiate a cross-channel communication session from a dialog when the CMM framework 310 has been given permission by a user to access a dialog over a channel). To identify commands, requests, and/or other cross-channel communication related communication, the dialog conversion/relay module 314 can include natural language processing, voice-to-text techniques, video-to-text techniques, and/or other semantic disambiguation techniques and techniques that convert dialog to a format useable by the natural language processing services to identify when a service of an agent may be relevant. In some examples, the dialog conversion/relay module 314 can be programmed to continuously monitor dialog for commands, requests, and/or other cross-channel communication related communication. In other examples, the dialog conversion/ relay module 314 can be programmed to monitor dialog for commands, requests, and/or other cross-channel communication at the user's direction, during a time of day, on particular channel(s), between the user and particular other client device(s), for channel(s) having a certain level of permissions and/or security, etc.

In some examples, the dialog conversion/relay module 314 can facilitate seamless continuation of dialog between changed channels. The decision to move dialog to another channel, to add a form of communication to the channel, or to add a channel to the dialog session can be based, at least in part, on data collected by the session tracking module 318 in some examples. In some examples, session tracking module 318 can track session data such as, for example, indicated user preference, metadata related to channel use (e.g., a channel in use by the user, active/inactive status of client device(s) and/or channel(s), analytics regarding use of channel(s) and/or client device(s), channels more or less commonly used on different client devices, etc.), message content or metadata (e.g., time message sent and/or received, location message sent, location message received, for which channel(s) and/or client device(s) are used, message content, dialog data, identities of parties communicating in a dialog, message format), etc.

In some examples, session tracking module 318 can detect a change in a channel-in-use by a user based at least in part on one or more of volume of user activity, a cessation of communication via one channel and a start or continuation of communication in a second channel, time of day, an active status, a channel that a user has indicated is the channel-in-use, a preferred channel, a channel from which most-recent communication has been received, or a channel preferred to be the channel-in-use based at least in part on one or more of a time, a location of the user, an IP address associated with communication received from the channel, a calendar event, or a status of a device. Based at least in part on one or more of these, the dialog conversion/relay module 314 can additionally relay data to a new channel, while ceasing or continuing relaying data to a former channel.

In some examples, the dialog conversion/relay module 314 can provide a context of the dialog to a new channel (e.g, the dialog conversion/relay module 314 can request a portion of the communication log stored by the communication log module 316 and relay a portion of the communication log to a client device associated with the new channel). For example, the dialog conversion/relay module 314 can provide messages relayed in a dialog within a recent time frame (e.g., last 10 minutes, last hour, last day, last week, etc.) or a defined number of messages recently relayed (e.g. last 10 messages relayed, last 10 messages relayed by each user associated with the dialog session, last 100 messages relayed, etc.).

Example User Interfaces

Figure 4:
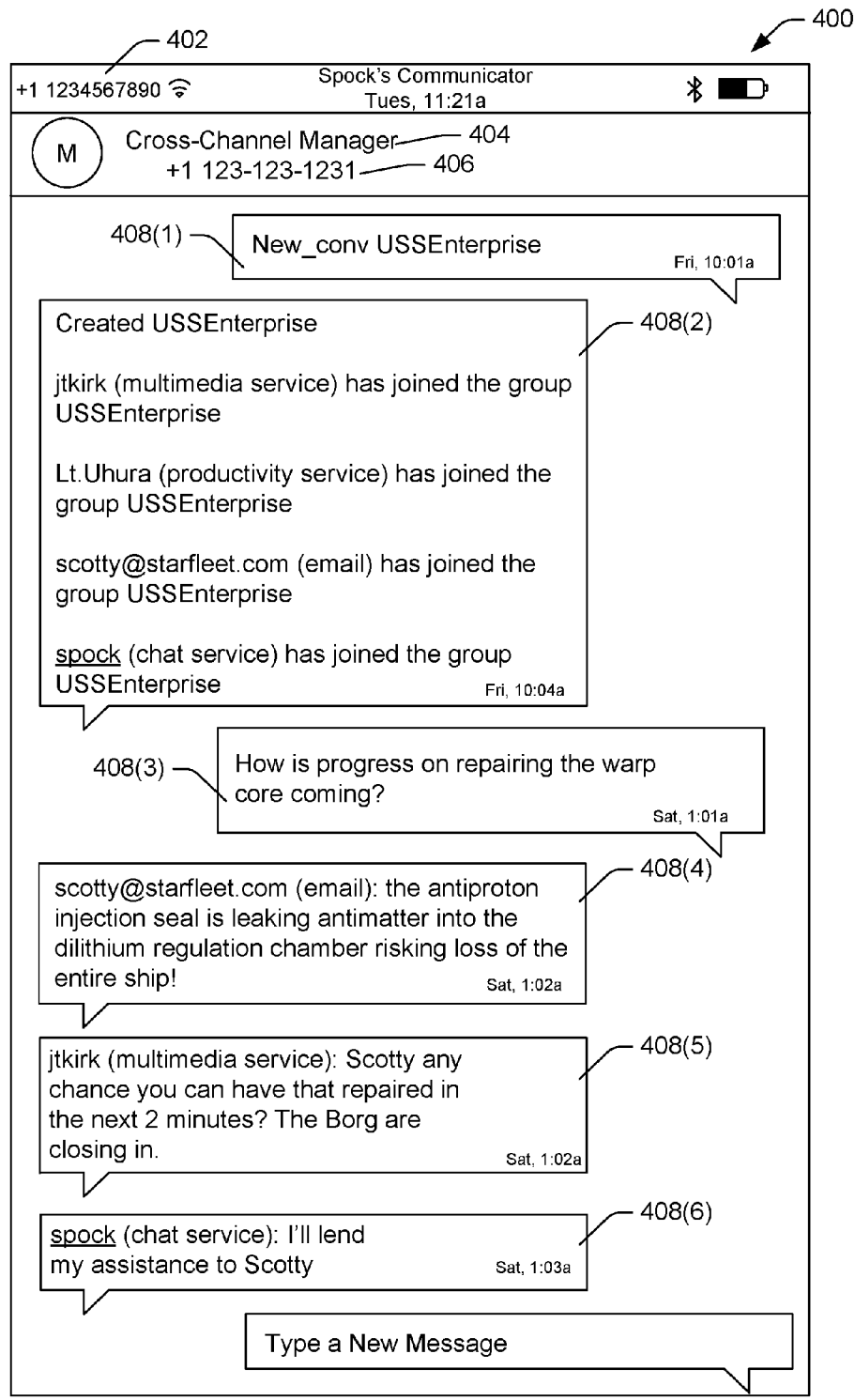
FIG. 4 is a pictorial diagram of an example user interface during an example cross-channel communication session from the perspective of a first user device.
Figure 5:
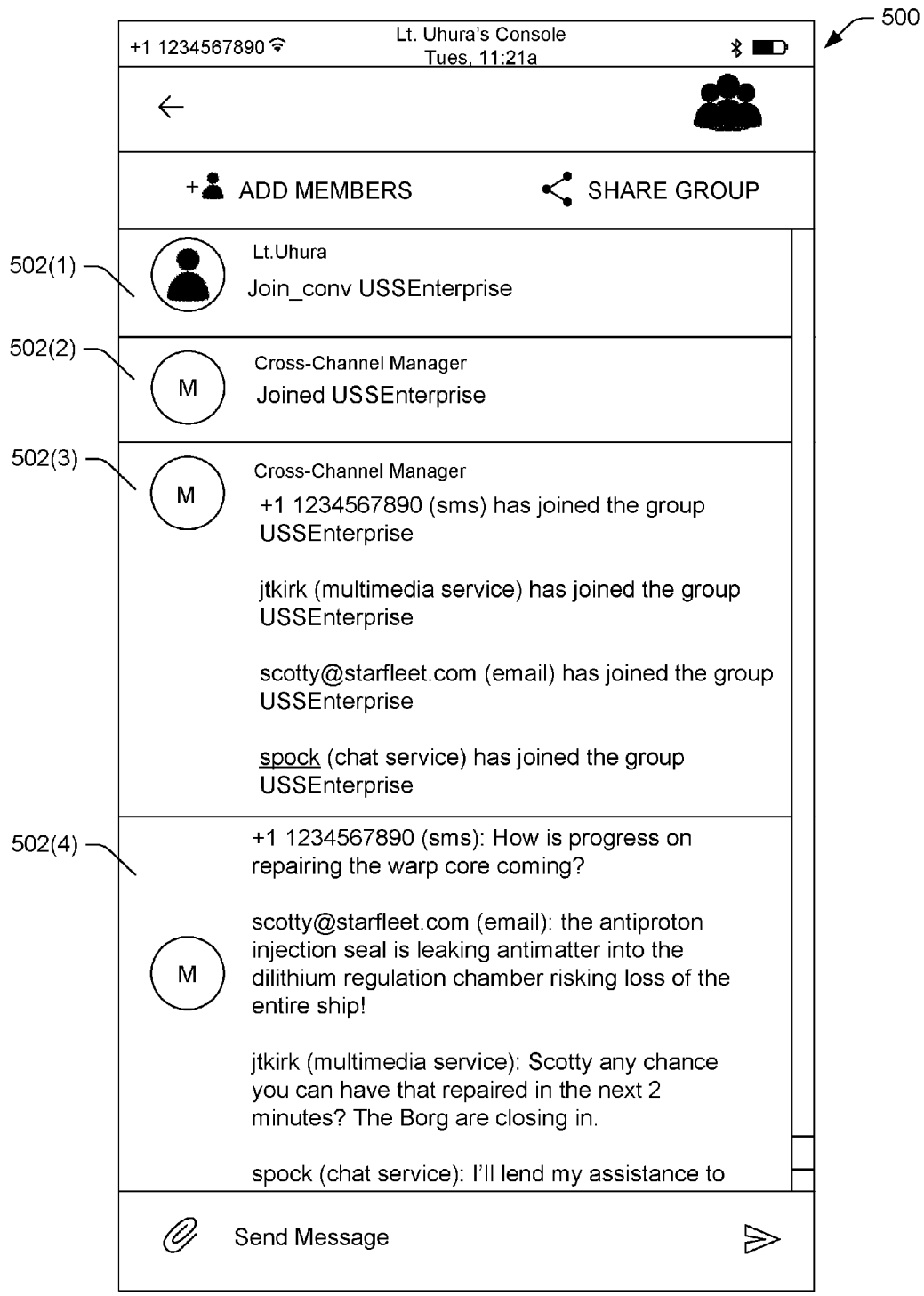
FIG. 5 is a pictorial diagram of an example user interface during an example cross-channel communication session from the perspective of a second user device.
Figure 6:
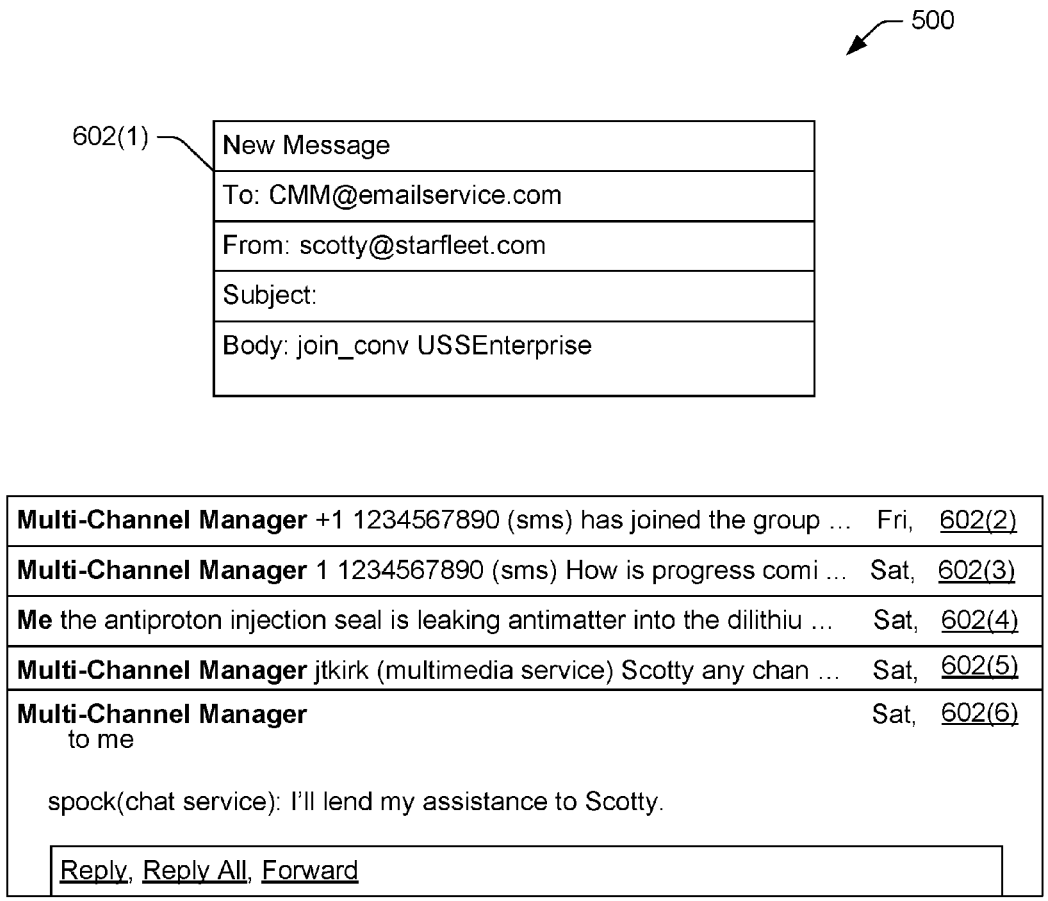
FIG. 6 is a pictorial diagram of an example user interface during an example cross-channel communication session from the perspective of an email service interface.

FIGS. 4-6 depict example user interfaces through which the techniques described herein can be deployed. In particular, FIGS. 4-6 depict example user interfaces associated with different channels and client devices for sending messages to and receiving messages from the different channels.

FIG. 4 depicts an example user interface 400 associated with an SMS channel and a user identification 402 for the SMS channel (i.e., +1 123-456-7890, which is depicted in FIG. 4 for understanding) and a client device named "Spock's Communicator." The example user interface 400 includes a reference to a "Cross Channel Manger" contact 404 having a phone number 406 associated therewith. Visual representations of messages (408(1)-408(6)) in the example user interface 400 correspond to messages sent and received over the channel. The example user interface 400 includes a message representation 408(1) including a command to initiate a cross-channel communication session named "USSEnterprise." After sending this message to the CMM SMS number 406 (i.e., +1 123-123-1231), the CMM can associate one or more of the phone number from which the command was received (i.e., +1 1234567890), which can be the user identification 402 (i.e., +1 123-456-7890), the client device from which the command was received (i.e., Spock's Communicator), a channel identifier (i.e., SMS), or the dialog session identifier (i.e., USSEnterprise), as discussed above. A user can then disseminate the dialog session identifier for other users to join the cross-channel communication session (or for the user to join the session from a different channel in some examples). For example, the user may orally communicate the dialog session identifier to other individuals, include the session identifier in a publication or advertisement, and/or communicate the dialog session identifier over a channel (e.g., email-to-email, etc.), among others.

After other users have joined the cross-channel communication session, as depicted by the example message representation 408(2), in some examples, further communication within the example user interface 400 can be relayed by the CMM to client devices that have joined the cross-channel communication channel. For example, the message representation 408(3) represents a message sent by the user to the CMM, which was subsequently relayed by the CMM to the client devices associated with the user identifications and channels represented in message representation 408(2). Depending on the channel fidelity, the user may need to include a dialog session identifier in messages sent via the channel (e.g., if the channel is of such low fidelity that it doesn't provide "conversations" where the channel or channel interface groups messages belonging to one dialog (e.g., same parties to a dialog) in one interface or session).

Messages sent to the CMM by the other client devices that have joined the dialog session and pursuant to the dialog session can be relayed by the CMM to the client device, as message representations 408(4)-408(6) illustrate.

FIG. 5 depicts an example user interface 500 associated with a productivity service channel and a client device named "Lt. Uhura's Console." The example user interface 500 illustrates the perspective of one of the other client devices that joined the dialog session, "USSEnterprise," and representations of the messages relayed and represented in example user interface 400 shown in FIG. 4. In some examples, in order to join the cross-channel communication session, the user associated with "Lt. Uhura's Console" must first learn of the dialog session identifier, "USSEnterprise." For example, the user may orally communicate the dialog session identifier to other individuals, include the session identifier in a publication or advertisement, and/or communicate the dialog session identifier over a channel (e.g., email-to-email, etc.), among others. Once apprised of the dialog session identifier, the user can send a join request to the CMM as message representation 502(1) illustrates. In some productivity services, rather than directly contacting an account associated with the CMM, a user may have previously added a user account associated with the CMM to a group conversation. In these examples, a user can enter the request in the group conversation and the CMM, able to access the conversation by the user account associated with the CMM (e.g., a CMM account for the service) in the group conversation, can detect the request from the group conversation. In another example, a user can join the dialog session via any other manner described above. The CMM can provide a confirmation to the group conversation as message representation 502(2) illustrates. In some examples, the CMM can also provide information regarding other users that join the dialog session as messages representation 502(3) illustrates.

Message representation 502(4) illustrates messages relayed to the client device, "Lt. Uhurah's Console," via the productivity service channel and user identification (i.e., Lt.Uhura, see FIG. 4 at message representation 408(2)) associated therewith. Message representation 502(4) also depicts a "batch" delivery of relayed messages. In some examples, the relayed messages can be delivered and/or displayed per author, per message, per push or pull, or any combination thereof.

FIG. 6 depicts an example user interface 600 associated with an email channel and a user identification, "scotty@starfleet.com." In some examples, the user identification can also be associated with a client device. The example user interface 600 illustrates the perspective of a user identification associated with a channel that joins the dialog session, "USSEnterprise," and representations of the messages relayed and represented in example user interfaces 400 and 500. In some examples, in order to join the cross-channel communication session, the user associated with "scotty@starfleet.com" must first learn of the dialog session identifier, "USSEnterprise." For example, the user may orally communicate the dialog session identifier to other individuals, include the session identifier in a publication or advertisement, and/or communicate the dialog session identifier over a channel (e.g., email-to-email, etc.), among others. Once apprised of the dialog session identifier, the user can send a join request to the CMM as message representation 602(1) illustrates. In another example, a user can join the dialog session via any other manner described above. In some examples, the CMM can also provide information regarding other users that join the dialog session as messages representation 602(2) illustrates.

Message representations 602(3), 602(5), and 602(6) illustrate messages relayed to the user identification at the email channel (the destination scotty@starfleet.com). Message representation 602(4) is a message sent from the email scotty@starfleet.com to the CMM (by replying to CMM@emailservice.com in this example), which then relays the content of the email, converting when necessary, to the client devices associated with the dialog session, as FIGS. 3-5 illustrate. FIG. 6 also illustrates one example where representations of messages are displayed individually.

Note that in these examples, each of the example user interfaces associated with the respective channels receives and displays messages created and sent over other channels.

Example Processes

Figure 7:
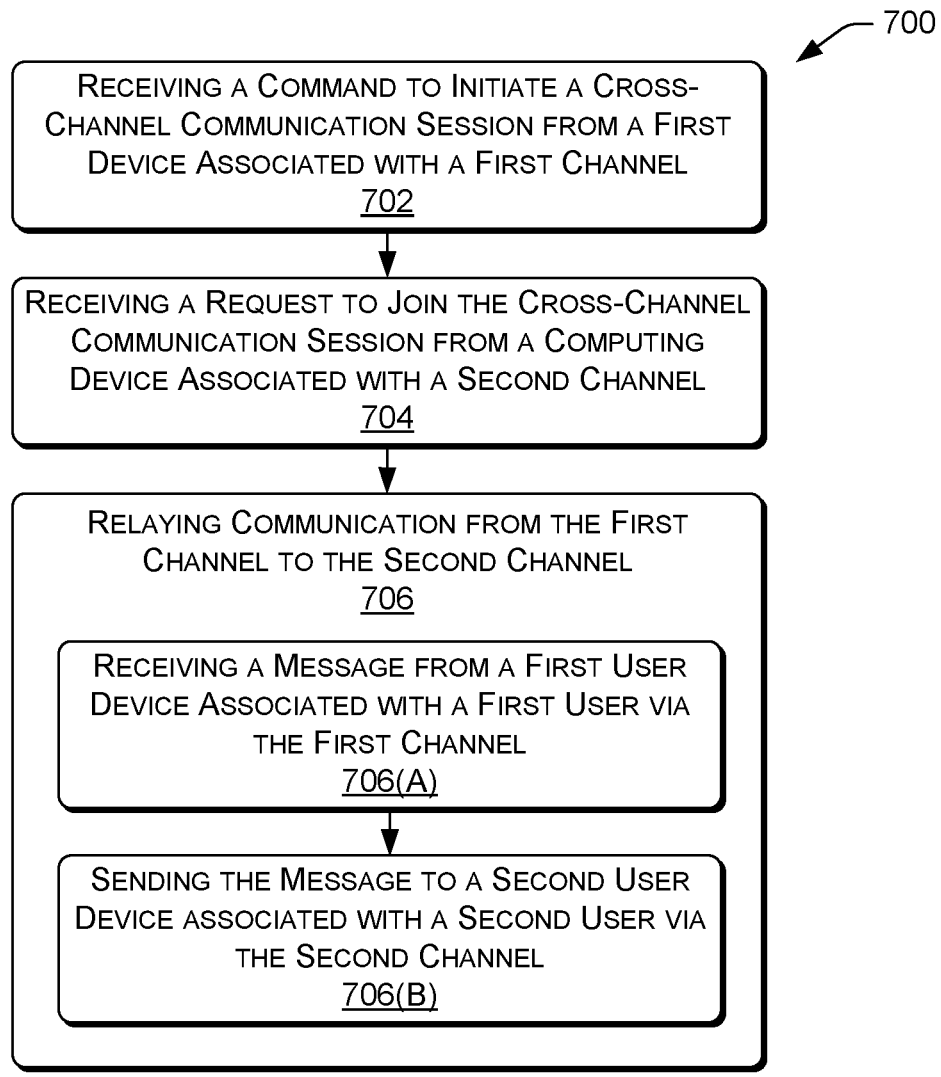
FIG. 7 is a flow diagram illustrating an example process to relay communication from a first channel to a second channel in a cross-channel communication session.
Figure 8:
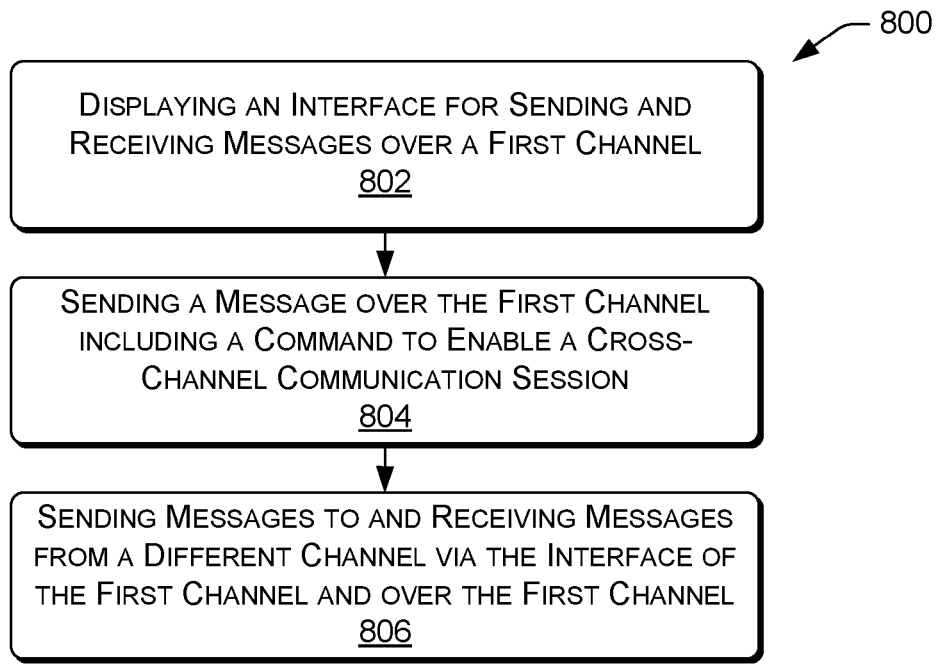
FIG. 8 is a flow diagram illustrating an example process to send message to and receive messages from a different channel than the one associated with an interface displayed by the device
Figure 9:
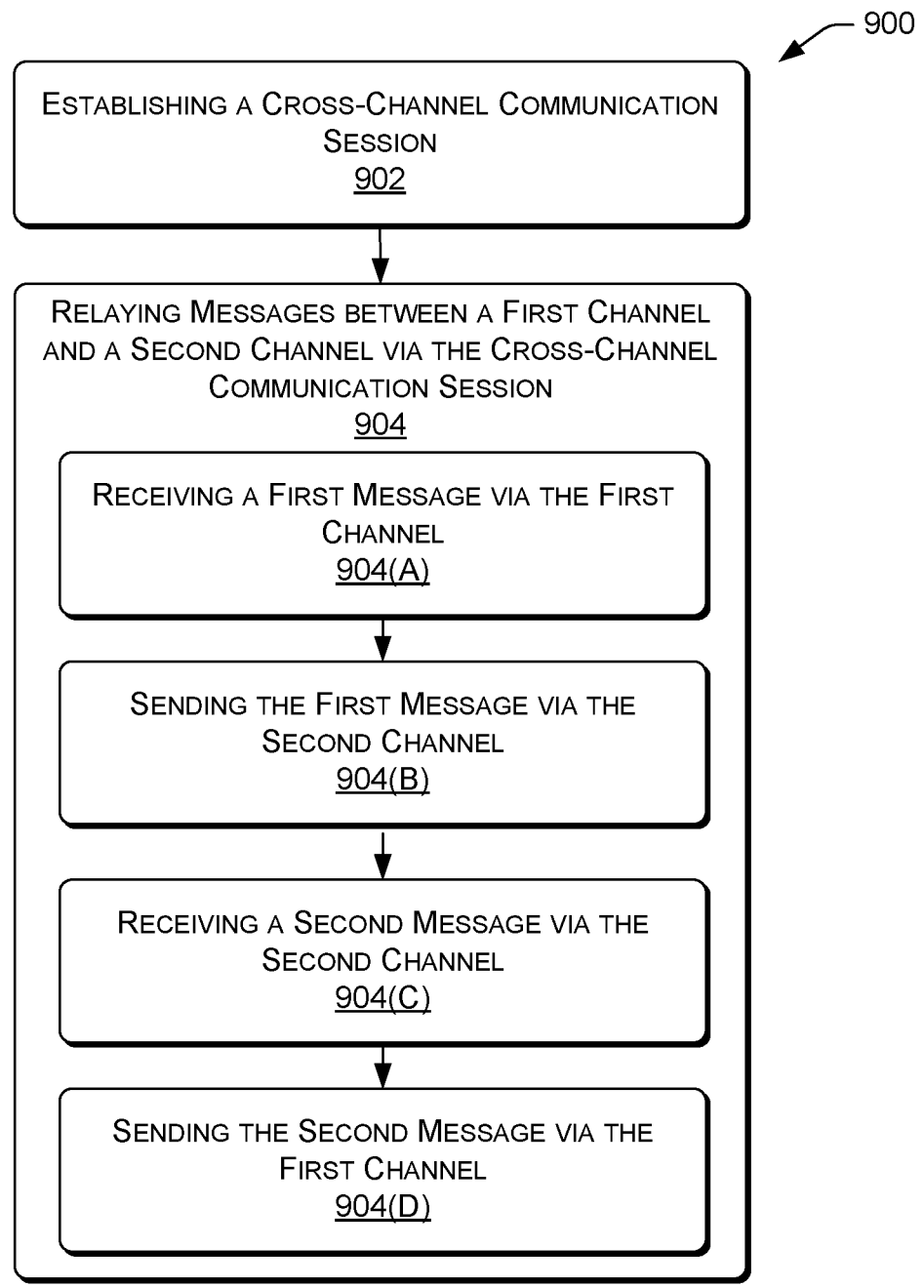
FIG. 9 is a flow diagram illustrating an example process to relay messages between a first channel and a second channel via a cross-channel communication session.

FIGS. 7-9 illustrate example processes 700, 800, and 900, which can be performed in whole or in part. These processes can, but need not be, performed in the environment 100 of FIG. 1, the scenario 300, and/or using the device 300 of FIG. 3.

FIG. 7 depicts an illustrative process 700 of implementing cross-channel communication.

At 702, the system can receive a command to initiate a cross-channel communication session from a first device associated with a first channel via the I/O interface(s) 322 and/or the network interface(s) 324 in any manner described herein. For example, the dialog conversion/relay module 314 can receive the command and establish the cross-channel communication session as discussed above.

At 704, the system can receive a request to join the cross-channel communication session from a computing device associated with a second channel via the I/O interface(s) 322 and/or the network interface(s) 324 in any manner described herein. For example, the dialog conversion/relay module 314 can receive the request and add the second channel and computing device to the cross-channel communication session, as discussed above.

At 706 the system can relay communication by the CMM framework 310 from the first channel to the second channel, where relaying communication from the first channel to the second channel can include receiving a message from a first client device associated with a first user via the first channel (706(A)) via the I/O interface(s) 322 and/or the network interface(s) 324 and sending the message to a second client device associated with a second user via the second channel (706(B)) via the I/O interface(s) 322 and/or the network interface(s) 324.

FIG. 8 depicts an illustrative process 800 of implementing cross-channel communication.

At 802, a device, such as a client device, can cause display of an interface for sending and receiving messages over a first channel (e.g., example user interfaces 400, 500, and 600). Although example user interfaces 400, 500, and 600 are graphical user interfaces, the techniques can include other interfaces such as, for example touch, audio, command line, etc. interfaces. In some examples, the interface of 802 can be associated with the first channel.

At 804, the device can send a message over the first channel which includes a command to enable a cross-channel communication in any manner described herein.

At 806 the device can send to and receive messages from a different channel and display representations of the messages sent and receive via the interface by operation of the CMM framework 310.

FIG. 9 depicts an illustrative process 900 of implementing cross-channel communication.

At 902, the process includes establishing a cross-channel communication session. For example, forming a cross-channel communication session can include, receiving a command via the first channel from a first client device and associating an identifier of at least the first channel, a user identification associated with a first user and corresponding to the first channel, and a cross-channel session identifier. In some examples, the dialog conversion/relay module 314 can receive the command. In some examples, the establishment of the cross-channel communication session can further include receiving a request to join the cross-channel communication session from a second client device via a second channel and, in response to the request, associating an identifier of at least the second channel, a user identification associated with the second user and corresponding to the second channel, and the cross-channel session identifier. In some examples, the dialog conversion/relay module 314 can receive the request and associate together the identifier, user identification, and cross-channel session identifier.

At 904, the process includes relaying messages between a first channel and a second channel via the cross-channel communication session (e.g., via the CMM framework 310 as discussed above), which can include receiving a first message via the first channel (904(A)), sending the first message via the second channel (904(B)), receiving a second message via the second channel (904(C)), and sending the second message via the first channel (904(D)).

Example Clauses

A. A method comprising: receiving, via a first channel and from a first computing device associated with the first channel, a command to initiate a cross-channel communication session; receiving, via a second channel and from a second computing device associated with the second channel, a request to join the cross-channel communication session, the second channel being different than the first channel; and based at least in part on receiving the command and the request, relaying communication from the first computing device to the second computing device by receiving a message from the first client device via the first channel and sending the message to the second client device via the second channel.

B. A method paragraph A recites further comprising: identifying a third channel associated with a user associated with at least one of the first client device or the second client device, based at least in part on user account data; and relaying communication between the first channel and the second channel to the third channel.

C. A method as paragraph A or B recites, wherein: the command includes a first command and a conversation name; and wherein the request includes a second command and the conversation name.

D. A method as any of paragraphs A-C recites further comprising storing: the conversation name, user account data associated with a first user associated with the first channel, user account data associated with a second user associated with the second channel, and identifiers of the first channel and the second channel.

E. A method as any of paragraphs A-D recites, wherein the user account data includes a username or user identifier and is free of user account credentials.

F. A method as any of paragraphs A-E recites further comprising selecting a third channel to which to relay communication based at least in part on one or more of: an indicated user preference of the third channel, metadata related to channel use, or message content or metadata.

G. A method as any of paragraphs A-F recites further comprising: based at least in part on selecting the third channel, discontinuing communication via the first channel or the second channel; and relaying communication between a remaining one of the first channel or the second channel and the third channel.

H. A method as any of paragraphs A-G recites further comprising, based at least in part on selecting the third channel, replicating communication between the first channel and the second channel over the third channel.

I. A method as any of paragraphs A-H recites further comprising storing information regarding multiple agent accounts, the multiple agent accounts allowing a cross-channel communication manager to communicate over channels corresponding to the agent accounts, the channels corresponding to the agent accounts including the first channel and the second channel.

J. A method as any of paragraphs A-I recites further comprising: receiving the message from the first computing device at a first agent account associated with the first channel; and sending the message from a second agent account associated with the second channel to the second computing device.

K. A method comprising: causing display of an interface for sending and receiving messages over a first channel; sending a message over the first channel, the message including a command to enable a cross-channel communication session; and sending messages to and receiving messages from a second channel via the interface of the first channel and over the first channel and based at least in part on the cross-channel communication session.

L. A method as paragraph K recites, wherein the interface is a first interface, the method further comprising: displaying a second interface for sending and receiving messages over a third channel; sending a message over the third channel, the message including a command to join the cross-channel communication session; in response to joining the cross-channel communication session: displaying, via the second interface, messages sent to the first channel from the second channel; displaying, via the second interface, messages sent from the first channel to the second channel; and via the second interface and over the third channel, sending messages to and receiving messages from the first channel and the second channel.

M. A method comprising: establishing a cross-channel communication session; relaying messages between a first channel and a second channel via the cross-channel communication session, the relaying including: receiving a first message via the first channel; delivering the first message via the second channel; receiving a second message via the second channel; and delivering the second message via the first channel.

N. A method as paragraph M recites, wherein establishing the cross-channel communication session includes: receiving, via the first channel and from a first client device, a command to establish the cross-channel communication session; associating together an identifier of the first channel, a user identification associated with a first user and corresponding to the first channel, and a session identifier; receiving, via a second channel and from a second client device, a request to join the cross-channel communication session; and at least partly in response to receiving the request, associating together an identifier of the second channel, a user identification associated with a second user and corresponding to the second channel, and the cross-channel session identifier.

O. A method as paragraph M or N recites further comprising: identifying a third channel associated with a particular user of the first user or the second user; identifying a user identification corresponding to the third channel and associated with the particular user; and associating together an identifier of the third channel, the user identification associated with the particular user, and the session identifier.

P. A method as any of paragraphs M-O recites further comprising: receiving a termination command; and disassociating the cross-channel communication session from channel identifiers and user identifiers.

Q. A method as any of paragraphs M-P recites further comprising: storing a user profile associated with the first channel; identifying a third channel associated with the user profile; detecting a change of activity associated with the third channel; and additionally relaying the messages to the third channel.

R. A method as any of paragraphs M-Q recites further comprising, based at least in part on detecting the change of activity: relaying communication between the first channel and the second channel to a client device associated with the third channel; receiving via the third channel communication from the client device associated with the third channel; and relaying communication from the client device associated with the third channel to client devices associated with the first channel and the second channel.

S. A method as any of paragraphs M-R recites, wherein the change of activity includes a change of one or more of: channel metadata; client device metadata; message content or metadata. a user indication; metadata regarding a user; or user profile data.

T. A method as any of paragraphs M-S recites further comprising: storing a user profile associated with the first channel; identifying a third channel associated with the user profile; detecting a change of activity associated with the third channel; and relaying the messages to the third channel instead of to the first channel at least partly in response to detecting the change of activity.

A computer-readable media having thereon computer-executable instructions to, upon execution, program a computer to perform a method as any of paragraphs A-J recites.

A computer-readable media having thereon computer-executable instructions to, upon execution, program a computer to perform a method as paragraph K or L recites.

A computer-readable media having thereon computer-executable instructions to, upon execution, program a computer to perform a method as any of paragraphs M-T recites.

A system comprising: one or more processors; and computer-readable media having thereon computer-executable instructions, the computer-executable instructions to configure the one or more processors to perform a method as any of paragraphs A-J recites.

A system comprising: one or more processors; and computer-readable media having thereon computer-executable instructions, the computer-executable instructions to configure the one or more processors to perform a method as paragraph K or L recites.

A system comprising: one or more processors; and computer-readable media having thereon computer-executable instructions, the computer-executable instructions to configure the one or more processors to perform a method as any of paragraphs M-T recites.

A system comprising: means for processing; means for storing; and means for performing any steps of a method as any of paragraphs A-J recites.

A system comprising: means for processing; means for storing; and means for performing any steps of a method as paragraph K or L recites.

A system comprising: means for processing; means for storing; and means for performing any steps of a method as any of paragraphs M-T recites.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or any combination thereof. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A method comprising:
  receiving, from a first cross-channel account associated with a first channel, a command to initiate a cross-channel communication session, wherein the first cross-channel account receives the command via the first channel and from a first user account associated with the first channel;
  generating a session identifier based on the command;
  receiving, from a second, different cross-channel account associated with a second channel, a request to join the cross-channel communication session, the second channel being different than the first channel, wherein the second account receives the request via the second channel and from a second user account associated with the second channel, and wherein the request comprises the session identifier;
  storing an association between the first channel and the first user account, the second channel and the second user account, and the session identifier; and
  based at least in part on receiving the command and the request, relaying communication from the first cross-channel account originating from the first user account via the first channel to the second cross-channel account destined for the second user account via the second channel based on the stored association.

2. The method of claim 1, further comprising:
  identifying a third channel associated with a user associated with at least one of a first client device or a second client device, based at least in part on user account data; and
  relaying communication between the first channel and the second channel to the third channel.

3. The method of claim 1, wherein the command includes a first command and a conversation name, and wherein the request includes a second command and the conversation name.

4. The method of claim 3, further comprising:
  storing the conversation name;
  storing user account data associated with a first user associated with the first channel;
  storing user account data associated with a second user associated with the second channel; and storing identifiers of the first channel and the second channel.

5. The method of claim 4, wherein the user account data includes a username or user identifier and is free of user account credentials.

6. The method of claim 1, further comprising selecting a third channel to which to relay communication based at least in part on one or more of:
an indicated user preference of the third channel,
metadata related to channel use, or
message content or metadata.

7. The method of claim 6, further comprising:
based at least in part on selecting the third channel, discontinuing communication via the first channel or the second channel; and
relaying communication between a remaining one of the first channel or the second channel and the third channel.

8. The method of claim 6, further comprising, based at least in part on selecting the third channel, replicating communication between the first channel and the second channel over the third channel.

9. A system comprising:
one or more electronic processors configured to:
receive, from a first cross-channel account associated with a first channel, a command to initiate a cross-channel communication session, wherein the first cross-channel account receives the command via the first channel and from a first user account associated with the first channel;
generate a session identifier based on the command;
receive, from a second, different cross-channel account associated with a second channel, a request to join the cross-channel communication session, the second channel being different than the first channel, wherein the second account receives the request via the second channel and from a second user account associated with the second channel, and wherein the request comprises the session identifier;
store an association between the first channel and the first user account, the second channel and the second user account, and the session identifier; and
based at least in part on receiving the command and the request, relay communication from the first cross-channel account originating from the first user account via the first channel to the second cross-channel account destined for the second user account via the second channel based on the stored association.

10. The system of claim 9, wherein the one or more electronic processors are further configured to:
identify a third channel associated with a user associated with at least one of a first client device or a second client device, based at least in part on user account data; and
relay communication between the first channel and the second channel to the third channel.

11. The system of claim 9, wherein the command includes a first command and a conversation name, and wherein the request includes a second command and the conversation name.

12. The system of claim 11, wherein the one or more electronic processors are further configured to:
store the conversation name;
store user account data associated with a first user associated with the first channel;
store user account data associated with a second user associated with the second channel; and
store identifiers of the first channel and the second channel.

13. The system of claim 12, wherein the user account data includes a username or user identifier and is free of user account credentials.

14. The system of claim 9, wherein the one or more electronic processors are further configured to select a third channel to which to relay communication based at least in part on one or more of:
an indicated user preference of the third channel,
metadata related to channel use, or
message content or metadata.

15. The system of claim 14, wherein the one or more electronic processors are further configured to:
based at least in part on selecting the third channel, discontinue communication via the first channel or the second channel; and
relay communication between a remaining one of the first channel or the second channel and the third channel.

16. A computer-readable storage media storing computer-executable instructions, the stored instructions comprising:
instructions to receive, from a first cross-channel account associated with a first channel, a command to initiate a cross-channel communication session, wherein the first cross-channel account receives the command via the first channel and from a first user account associated with the first channel;
instructions to generate a session identifier based on the command;
instructions to receive, from a second, different cross-channel account associated with a second channel, a request to join the cross-channel communication session, the second channel being different than the first channel, wherein the second account receives the request via the second channel and from a second user account associated with the second channel, and wherein the request comprises the session identifier;
instructions to store an association between the first channel and the first user account, the second channel and the second user account, and the session identifier; and
instructions to, based at least in part on receiving the command and the request, relay communication from the first cross-channel account originating from the first user account via the first channel to the second cross-channel account destined for the second user account via the second channel based on the stored association.

17. The computer-readable storage media of claim 16, wherein the instructions further comprise:
instructions to identify a third channel associated with a user associated with at least one of a first client device or a second client device, based at least in part on user account data; and
instructions to relay communication between the first channel and the second channel to the third channel.

18. The computer-readable storage media of claim 16, wherein the command includes a first command and a conversation name, and wherein the request includes a second command and the conversation name.

* * * * *